United States Patent
Osterloh et al.

(10) Patent No.: US 9,621,411 B2
(45) Date of Patent: Apr. 11, 2017

(54) RELAYING INFORMATION FOR AN UNRELIABLY HEARD UTILITY NODE

(71) Applicant: Itron, Inc., Liberty Lake, WA (US)

(72) Inventors: Christopher Lloyd Osterloh, Waseca, MN (US); Scott L. Cumeralto, Spokane Valley, WA (US); Keith Wayne Barnes, Waseca, MN (US); Merv Grindahl, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 365 days.

(21) Appl. No.: 13/842,622

(22) Filed: Mar. 15, 2013

(65) Prior Publication Data

US 2014/0029415 A1  Jan. 30, 2014

Related U.S. Application Data

(60) Provisional application No. 61/675,682, filed on Jul. 25, 2012.

(51) Int. Cl.
| | | |
|---|---|---|
| *H04W 4/00* | (2009.01) | |
| *H04L 12/24* | (2006.01) | |
| *H04L 12/26* | (2006.01) | |
| *H04L 12/707* | (2013.01) | |
| *H04L 12/703* | (2013.01) | |

(52) U.S. Cl.
CPC ...... *H04L 41/0668* (2013.01); *H04L 43/0811* (2013.01); *H04L 45/22* (2013.01); *H04L 45/28* (2013.01); *H04L 43/0817* (2013.01); *Y02B 90/246* (2013.01); *Y04S 20/42* (2013.01)

(58) Field of Classification Search
USPC ........ 370/221, 328; 455/41.1; 340/638, 644, 340/649, 652
See application file for complete search history.

(56) References Cited

U.S. PATENT DOCUMENTS

| | | | | |
|---|---|---|---|---|
| 5,874,903 A * | 2/1999 | Shuey et al. | ............. | H04Q 9/00 375/269 |
| 7,061,924 B1 * | 6/2006 | Durrant et al. | ....... | H04W 84/04 370/401 |
| 7,689,224 B2 * | 3/2010 | Chari et al. | ........... | H04W 88/04 455/445 |
| 7,881,229 B2 * | 2/2011 | Weinstein et al. | .... | H04L 45/025 370/255 |
| 7,940,679 B2 * | 5/2011 | Kelley | ................... | G01D 4/002 340/870.02 |
| 8,073,384 B2 * | 12/2011 | Shuey et al. | .......... | H04W 12/08 370/310 |

(Continued)

OTHER PUBLICATIONS

PCT Search Report and Written Opinion mailed Aug. 23, 2013 for PCT application No. PCT/US13/41150, 12 pages.

(Continued)

*Primary Examiner* — Phuongchau Ba Nguyen
(74) *Attorney, Agent, or Firm* — Lee & Hayes, PLLC (57) ABSTRACT

Data of a utility node that is unreliably heard may be relayed through another utility node. In some examples, utility nodes of a star network may attempt to transmit data to a collector, a repeater, a relay, a router, or a mobile device. When it is determined that a utility node is unable to reliably transmit data, a relay relationship may be established so that data of the unreliable utility node is relayed through the network.

20 Claims, 5 Drawing Sheets

(56) References Cited

U.S. PATENT DOCUMENTS

| | | | |
|---|---|---|---|
| 8,279,870 B2* | 10/2012 | Flammer, III et al. | H04L 45/22 370/392 |
| 8,787,323 B2* | 7/2014 | Laroia et al. | 370/336 |
| 9,082,291 B2* | 7/2015 | Barrett et al. | G06F 9/45525 370/392 |
| 2004/0001008 A1* | 1/2004 | Shuey | H04Q 9/00 340/870.02 |
| 2006/0233200 A1 | 10/2006 | Fifield et al. | |
| 2008/0144548 A1* | 6/2008 | Shuey | G01D 4/004 370/310 |
| 2009/0135018 A1* | 5/2009 | Veillette | H04L 41/06 340/657 |
| 2009/0181666 A1 | 7/2009 | Viswanath | |
| 2010/0165916 A1* | 7/2010 | Duan et al. | 370/328 |
| 2010/0208662 A1* | 8/2010 | Fuste Vilella | H04W 40/00 370/328 |
| 2010/0322248 A1 | 12/2010 | Ivanov | |
| 2011/0007663 A1 | 1/2011 | Scotton et al. | |
| 2011/0085494 A1* | 4/2011 | Ji et al. | 370/328 |
| 2011/0188452 A1* | 8/2011 | Borleske | G01D 4/004 370/328 |
| 2011/0252319 A1* | 10/2011 | Garcia et al. | 715/702 |
| 2011/0261764 A1* | 10/2011 | Shirakata | H04W 72/082 370/329 |
| 2012/0036250 A1* | 2/2012 | Vaswani | G01D 4/004 709/224 |
| 2012/0058759 A1* | 3/2012 | Lundborg | H04B 7/155 455/424 |
| 2012/0127916 A1 | 5/2012 | Yoo et al. | |
| 2012/0201125 A1* | 8/2012 | Bienfait et al. | 370/221 |
| 2012/0203918 A1* | 8/2012 | Berenberg | H04W 12/06 709/229 |
| 2012/0230204 A1* | 9/2012 | Vasseur | H04W 40/22 370/242 |
| 2013/0107999 A1* | 5/2013 | Mainaud | H04J 3/0638 375/362 |
| 2013/0271072 A1* | 10/2013 | Lee et al. | 320/108 |
| 2014/0029415 A1* | 1/2014 | Osterloh | H04L 41/0668 370/221 |

OTHER PUBLICATIONS

Extended European Search Report mailed Dec. 21, 2015 for European Patent Application No. 13823544.5, 9 pages.
Jokar, et al., "Specification-based Intrusion Detection for Home Area Networks in Smart Grids", Cyber and Physical Security and Privacy, IEEE SmartGridComm, 2011, pp. 208-213.
Mohanty, et al., "Quality of Service Analysis in IEEE 802.15.4 Mesh Networks using MANET Routing", 2010 Second International Conference on Computing, Communication and Networking Technologies, IEEE, 2010, 8 pages.

* cited by examiner

RELAYING INFORMATION FOR AN UNRELIABLY HEARD UTILITY NODE

CROSS REFERENCE TO RELATED APPLICATIONS

This application claims the benefit of U.S. Provisional Application No. 61/675,682, filed Jul. 25, 2012, the entire contents of which is incorporated herein by reference.

BACKGROUND

In a fixed network environment, an endpoint or node may be associated with metering of a consumable resource, such as electricity, natural gas, or water. The fixed network may be configured as a star, where each endpoint communicates with a mobile device, collector, router, and/or repeater. The communication may be by means of a radio frequency transmission and may allow the endpoint to communicate metering information.

A situation may arise within the star configuration of the fixed network where one or more endpoints are not reliably heard by the mobile device, collector, router, and/or repeater. For example, an obstruction or interference between an endpoint and a mobile device, collector, router, or repeater may impede a transmission from the endpoint. This may prevent devices of the network from communicating with the endpoint.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, a situation may arise when an endpoint in a network may not be reliably heard by a mobile device, a collector, a router, and/or a repeater due to an obstruction or interference between the endpoint and the mobile device, collector, and/or repeater. This may prevent devices of the network from communicating with the endpoint.

This disclosure describes techniques directed to relaying data for a utility node that may be unreliably heard. In some implementations, a fixed network may include endpoints configured in a "star" formation that communicate with a central node, such as a mobile device (e.g., handheld meter reader), a collector, a relay, a router, and/or a repeater. The endpoints may provide information to and/or receive information from a head-end device through the central node. In some instances, one or more of the endpoints may comprise a battery-powered device. While managing the network, the head-end device may determine that a particular endpoint is unable to reliably transmit data to the central node. For example, the head-end device may determine that a communication from the particular endpoint has not been received during a period of time or determine that less than a threshold number of communications have been received. Upon making such determination, the head-end device may cause another endpoint to relay information for the unreliable endpoint.

To relay information of the unreliable endpoint, the head-end device may select another endpoint that is in close proximity to the unreliable endpoint (e.g., within a particular distance) to act as a relay for the unreliable endpoint. The relay endpoint may comprise an endpoint that is reliably heard by a central node, such as an endpoint that is heard a particular number of times over a period of time. The head-end device may send a message to the relay endpoint requesting that the relay endpoint establish a relay relationship with the unreliable endpoint. In response to receiving the message, the relay endpoint may communicate with the unreliable endpoint to establish communications parameters for relaying information, such as a time and a channel for relaying information between the unreliable endpoint and the relay endpoint. The relay endpoint may receive data from the unreliable endpoint based on the established communication parameters.

The relay endpoint may then relay data of the unreliable endpoint by utilizing a portion of its normal transmission time. That is, the relay endpoint may utilize one portion of its transmission time (e.g., 50%) with a central node to transmit information of the relay endpoint and utilize another portion of the transmission time (e.g., the other 50%) to transmit the data of the unreliable endpoint. The data of the unreliable endpoint may be transmitted to the central node for delivery to the head-end device. If the head-end device or another device has data that is intended for the unreliable endpoint, the data may be relayed to the unreliable endpoint through the relay endpoint in a similar manner as data is relayed from the unreliable endpoint. When the unreliable endpoint is able to reliably transmit data (e.g., when the obstruction is no longer present), the endpoint may return to its normal operating state of communicating directly with a central node.

The techniques described herein may enable an unreliably heard endpoint to be heard over a network. For example, the techniques may allow an endpoint that is not heard due to an obstruction or interference between an endpoint and a mobile device, a collector, a relay, a router, and/or a repeater to relay data through another endpoint of the network. In addition, the techniques may allow a device that is not initially operating as a relay device to relay data for another device. Further, by utilizing a reliable endpoint to relay data for an unreliable endpoint, the techniques may ensure that the unreliable endpoint is heard.

In instances where one or more endpoints are battery-powered, the techniques may additionally, or alternatively, conserve battery life of the endpoints. For example, by utilizing a portion of a relay endpoint's transmission time to relay data of an unreliable endpoint, transmission time of the relay endpoint may be substantially maintained. This may conserve battery-life of the endpoints by avoiding additional transmission time. Moreover, by negotiating one or more communication parameters for relaying data between a relay endpoint and an unreliable endpoint (e.g., a time for receiving relay data, a communication channel, etc.), the techniques may allow two endpoints to establish a relationship for relaying information in an efficient manner (e.g., at a particular time, on a particular channel, etc.).

The relay techniques are described herein in the context of a fixed network where endpoints are configured in a star formation. Here, the endpoints may communicate with a mobile device, a collector, a relay, a router, or a repeater that acts as a central device for receiving data from the endpoints. Although these techniques are discussed in the context of a star network, the techniques may be applicable to any type of network, such as a "mesh" network in which nodes relay information from node-to-node, a "mobile" or "handheld" network in which nodes broadcast or "bubble up" their information to be collected by a mobile or handheld reader device that follows a route to read the meters, and/or other networks. Further, although the relay techniques are discussed herein in the context of utility node devices configured in a utility network, these techniques may alternatively, or additionally, be applicable to other types of computing devices and/or networks.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

Figure 1:
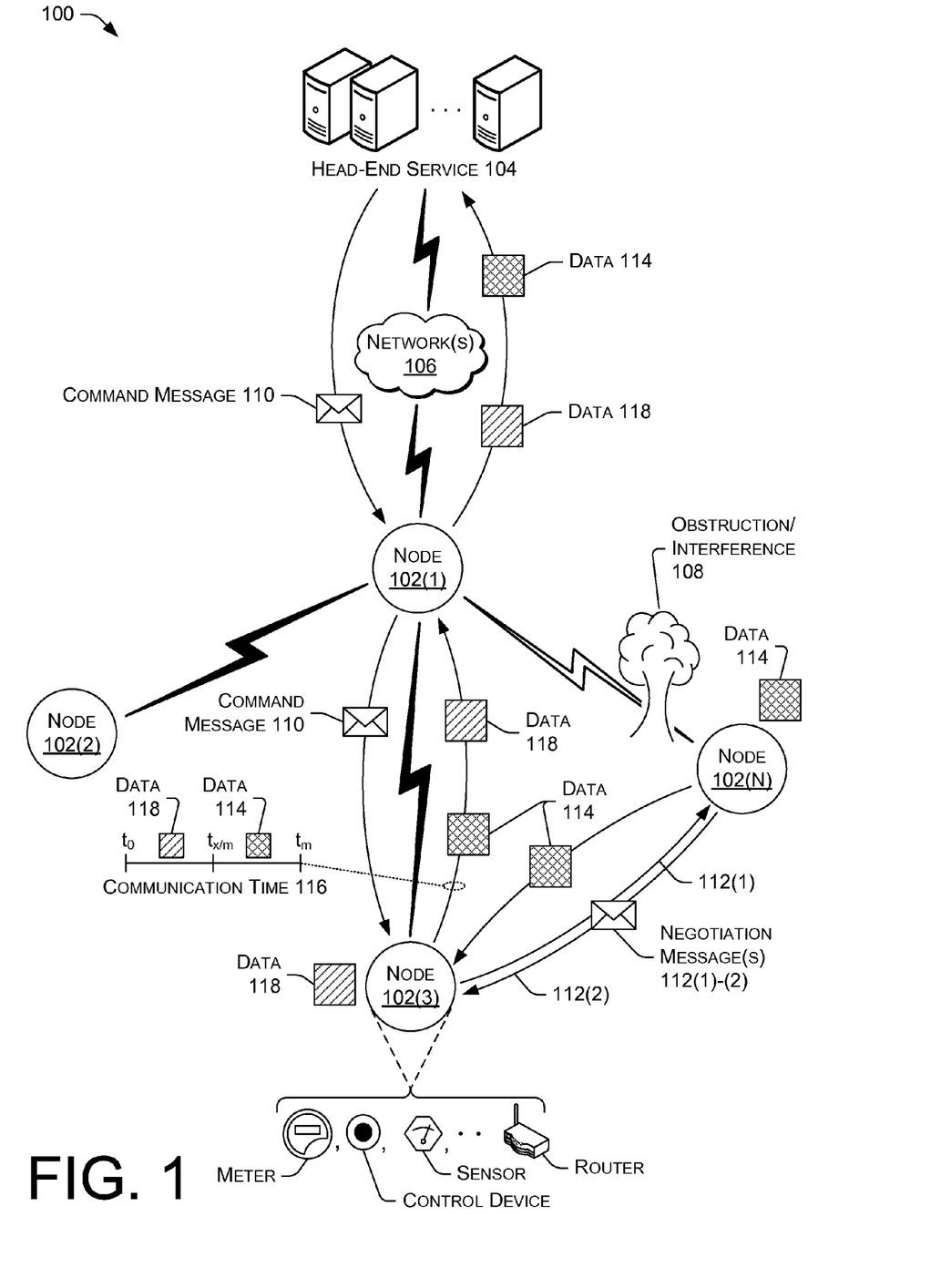
FIG. 1 illustrates an example architecture in which techniques described herein may be implemented.

FIG. 1 illustrates an example architecture 100 in which techniques described herein may be implemented. The architecture 100 includes a plurality of nodes 102(1), 102(2), 102(3), . . . 102(N) (collectively referred to as nodes 102) forming a utility node network, such as an autonomous routing area (ARA) network which may be part of a larger utility communication network. The utility node network may comprise, for example, a wide area network (WAN), metropolitan area network (MAN), local area network (LAN), neighborhood area network (NAN), personal area network (PAN), or the like.

In the architecture 100, the node 102(1) may act as a central node to collect/receive information (e.g., resource consumption data) from the nodes 102(2)-102(N) and provide information to the nodes 102(2)-102(N). The node 102(1) may comprise a collector, a repeater, a relay (e.g., cellular relay), a router, a mobile device (e.g., handheld meter reader), or another device designated or able to receive data of the nodes 102(2)-102(N). As such, in the example architecture 100 the nodes 102(2)-(N) may comprise "endpoints" of the utility node network. An endpoint may generally operate as a non-relay node for the utility node network (e.g., a node that does not relay data for another node). That is, an endpoint may generally receive data that is intended for the endpoint and transmit data of the endpoint. Although the node 102(1) is referred to as a central node and the nodes 102(2)-(N) are referred to as "endpoints" in the example architecture 100, any of the nodes 102 may act as a central node and/or an endpoint.

In the example architecture 100, the nodes 102 are configured in a "star" network with the node 102(1) acting as the central node for the nodes 102(2)-102(N). The central node of the "star" network may include communication and/or processing capabilities that are not included in endpoints. For example, the node 102(1) may be configured to communicate over longer distances, at higher data rates/power levels, with a wider range of modulation schemes, and so on than the nodes 102(2)-102(N). In another example, the node 102(1) is configured to receive data simultaneously from a plurality of nodes, while the nodes 102(2)-102(N) may only be able to receive data from a single node at a time. Additionally, or alternatively, the node 102(1) may include a faster processor, more memory, and so on, in comparison to the nodes 102(2)-102(N). Further, the endpoints of a "star" network may include different communication and/or processing capabilities than nodes of a "mesh" network. Although the techniques are described herein in the context of a "star" network, these techniques may alternatively, or additionally, be applicable to other types of networks, such as a mesh network.

As discussed in further detail below, when one of the nodes 102(2)-102(N) is unable to reliably communicate with the node 102(1), another of the nodes 102(2)-102(N) may relay information for the unreliable node. This may cause a node with no previous relay functionality to reconfigure and to act as a relay node for an unreliable node (e.g., cause a node that operates as a non-relay node for the utility node network to act as a relay node). By doing so, the techniques may enable an additional "hop" (e.g., relay) of information of the unreliable node.

In some implementations, the nodes 102 comprise battery-powered devices. The nodes 102 may operate in an active state (e.g., powered) when communicating (e.g., receiving or transmitting data) and/or performing metrology functions, and may operate in an inactive or sleep state (e.g., non-powered or power state below a particular level) at other times. The nodes 102 may activate according to a predetermined communication schedule in order to conserve battery life. The communication schedule may be established by an entity of the utility node network, such as the head-end service 104, the node 102(1), or any other device. This is in contrast to nodes of a "mesh" network, which are typically wired to an electricity source and maintain an active state.

The nodes 102 may be communicatively coupled to each other via direct communication paths (e.g., wireless connections). Each direct communication path may represent one or more channels and one or more modulation schemes over which a node is able to transmit and/or receive data. Each of the plurality of channels may be defined by a radio frequency (RF) frequency range which may be the same as or different from frequency ranges of others of the plurality of channels.

Each of the nodes 102 may be implemented as any of a variety of computing devices associated with, for example, smart utility meters (e.g., electric, gas, and/or water meters), control devices, sensors (e.g., temperature sensors, weather stations, frequency sensors, etc.), transformers, routers, servers, relays (e.g., cellular relays), switches, valves, combinations of the foregoing, or any device that may be coupled to a communication network and capable of sending and/or receiving data. In some cases, the nodes 102 may include different types of nodes (e.g., smart meters, cellular relays, sensors, etc.), different generations or models of nodes, and/or nodes that otherwise are capable of transmitting on different channels, frequencies and/or bandwidths and using different modulation schemes, data rates, protocols, signal strengths, and/or power levels. Accordingly, the architecture 100 may represent a heterogeneous network of nodes.

In the example of FIG. 1, the nodes 102 are configured to communicate with a head-end service 104 through a backhaul network(s) 106, such as the Internet. The nodes 102 may communicate with the head-end service 104 via an edge device (e.g., cellular relay, cellular router, edge router, DODAG root, etc.) which serves as a connection point of the utility node network to the backhaul network(s) 106. In the example of FIG. 1, the node 102(1) acts as an edge device. Although the example of FIG. 1 illustrates the head-end service 104 in a single location, in some examples the service 104 may be distributed amongst multiple locations and/or may be eliminated entirely (e.g., in the case of a highly decentralized distributed computing platform). The head-end service 104 may generally manage the nodes 102 by receiving resource consumption data from the nodes 102 and sending data to the nodes 102 (e.g., instructions, etc.).

While managing the nodes 102, the head-end service 104 may determine that one or more of the nodes 102(2)-102(N) are unable to reliably transmit data to the node 102(1). The determination may be based on one or more communication metrics of the nodes 102(2)-102(N). For example, the node 102(N) may be an unreliable node when less than a threshold number of communications have been received from the node 102(N) at the node 102(1) during a period of time. A communication metric (e.g., statistic) may generally indicate a reliability level of a node and may include, for example:

A number of communications the head-end service 104, the node 102(1), or another device has received from a node in total or over a time period (e.g., during a last week).

A ratio of a number of communications the head-end service 104, the node 102(1), or another device has received from a node to a number of expected communications from the node.

A quality of communications received at the head-end service 104, the node 102(1), or another device from a node (e.g., a decode-ability of a communication(s), a bit error rate associated with a communication(s), a signal-to-noise ratio associated with a communication(s), etc.).

An average, weighted average or combination of any of the above metrics over a period of time.

In this example of FIG. 1, an obstruction or interference 108 is located between the node 102(N) and the node 102(1), such as a tree, a building, a car, a hill or valley, an RF interference (e.g., competing transmitter/receiver), and so on. The obstruction or interference 108 may result in a transmission(s) from the node 102(N) not reaching the node 102(1) or not reaching the node 102(1) in a manner that satisfies one or more criteria. As such, the node 102(N) may be an unreliable node (e.g., may be said to have "lost connectivity to the network").

Upon determining that the node 102(N) is unable to reliably transmit data to the node 102(1), the head-end service 104 may select another node of the utility node network to relay data for the unreliable node 102(N). The head-end service 104 may select a node that is in communication range of the unreliable node 102(N), such as within a predetermined distance (e.g., 500 feet). The selection may be based on one or more communication metrics of those nodes. In this example, the node 102(3) is selected to act as a relay for the unreliable node 102(N).

The head-end service 104 may then send a command message 110 to the node 102(1) to cause the node 102(3) to relay data for the unreliable node 102(N). The command message 110 may request that the node 102(3) relay data for the unreliable node 102(N). The command message 110 may be forwarded from the node 102(1) to the node 102(3).

In response to receiving the command message 110, the node 102(3) may initiate communication with the unreliable node 102(N). The node 102(3) may send a negotiation message 112(1) to the unreliable node 102(N) informing the unreliable node 102(N) that it is not being reliably heard by the node 102(1). The negotiation message 112(1) may also request to establish a relay relationship with the unreliable node 102(N) so that data is relayed according to one or more communication parameters. In response to receiving the negotiation message 112(1), the unreliable node 102(N) may send a negotiating message 112(2) to establish the relay relationship. In some instances, the negotiation message 112(1) specifies the one or more communication parameters, while in other instances the one or more communication parameters are specified in the negotiation message 112(2). Although illustrated with two messages, the negotiation messages 112 may include any number of communications (e.g., one, five, etc.).

A communication parameter may comprise any parameter that relates to communication between nodes (e.g., RF parameters). For example, the communication parameter may include, for example:

A time for communicating. For example, the nodes 102(3) and 102(N) may negotiate to communicate data directly after or before normal communications on a network (e.g., one second after the node 102(3) communicates its own data). In another example, the nodes 102(3) and 102(N) may communicate on a particular interval (e.g., every 15 minutes) or at a particular time (e.g., 12:30 AM). Nodes may utilize a time parameter to know when to enter an active state and transmit/receive data. This may allow nodes to remain in an inactive state at other times.

A communication channel (e.g., an RF channel). This may specify a channel (e.g., channel 3) on which the nodes 102(3) and 102(N) may communicate to exchange data, such as data to be relayed.

A channel hopping sequence. This may specify an order and/or timing for channels used in channel hopping.

A modulation scheme, data rate, protocol, signal strength, power level, or any other parameter.

The nodes 102(3) and 102(N) may then communicate according to the one or more established communication parameters. For example, at a particular time and/or on a particular channel, the unreliable node 102(N) may transmit data 114 to the node 102(3) so that the data 114 may be relayed to other devices of the network. In some instances, the data 114 may comprise "bubble up" data, such as resource consumption data that is provided periodically to the head-end service 104. Although data of the unreliable node 102(N) may be relayed through the node 102(3), the unreliable node 102(N) may continue to transmit data to the node 102(1) or another device of the network in an attempt to communicate data over the network in a normal manner.

Thereafter, the node 102(3) may transmit the data 114 of the unreliable node 102(N) to the node 102(1) or another device within communication range. The data 114 may be transmitted during a communication period of time 116 that the node 102(3) utilizes to communicate with the node 102(1). The communication time 116 may be established by the network for communications from the node 102(3). The node 102(3) may utilize a portion of the communication time 116 (e.g., 50% of the time) to transmit the data 114 of the unreliable node 102(N) and utilize the remaining portion of the communication time 116 (e.g., 50%) to transmit data 118 of the node 102(3). The communication time 116 may be partitioned in any fashion, as illustrated by "$t_{x/m}$". When the node 102(3) and/or node 102(1) are battery-powered devices, battery life of the node 102(3) and/or node 102(1)

may be conserved by utilizing a portion of the normal communication time 116 (e.g., avoiding additional transmissions). Alternatively, or additionally, the data 114 of the unreliable node 102(N) may be transmitted at another time, such as directly before or after a normal communication time of the node 102(3), or any other time.

Upon receiving the data 114 of the unreliable node 102(N) and/or the data 118 of the node 102(3), the node 102(1) may send the data 114 and/or 118 to the head-end service 104. When data needs to be transferred to the unreliable node 102(N), the relay techniques may be used to send the data from the head-end service 104 to the unreliable node 102(N).

Although the example above describes the head-end service 104 initiating the relay process (e.g., making a determination that the node 102(N) is unreliable and sending the command message 110), the relay process may be initiated by any device, such as the node 102(1), the node 102(3), the unreliable node 102(N) itself, a mobile device, or any other device. In one example, the node 102(1) makes a determination that the node 102(N) is an unreliable node and sends a message to the node 102(3) to initiate the relay process with the unreliable node 102(N). As such, in some instances the head-end service 104 may maintain normal operations without sending the command message 110 and without knowledge that the node 102(N) is unreliable.

In another example, the node 102(N) itself may initiate the relay process. Here, the node 102(N) may determine that its communications are not being reliably heard when it has not received a communication from the node 102(1) over a predetermined period of time (e.g., 14 days). Here, the head-end service 104 may send messages periodically to the nodes 102 so that the nodes 102 are aware that they are being reliably heard (e.g., so that the nodes 102 know they remain connected to the network). If the node 102(N) does not receive one of these messages over the predetermined period of time, the node 102(N) may begin transmitting beacon messages (e.g., similar to the negotiation messages 112). The beacon messages may indicate that the node 102(N) is unable to reliably transmit data and/or may request that another node relay data of the node 102(N). When another node (e.g., the node 102(3)) receives the beacon message, the other node may enter into a relay relationship with the node 102(N). These beacon messages may be transmitted periodically until a relay relationship is established.

Example Head-End Service

Figure 2:
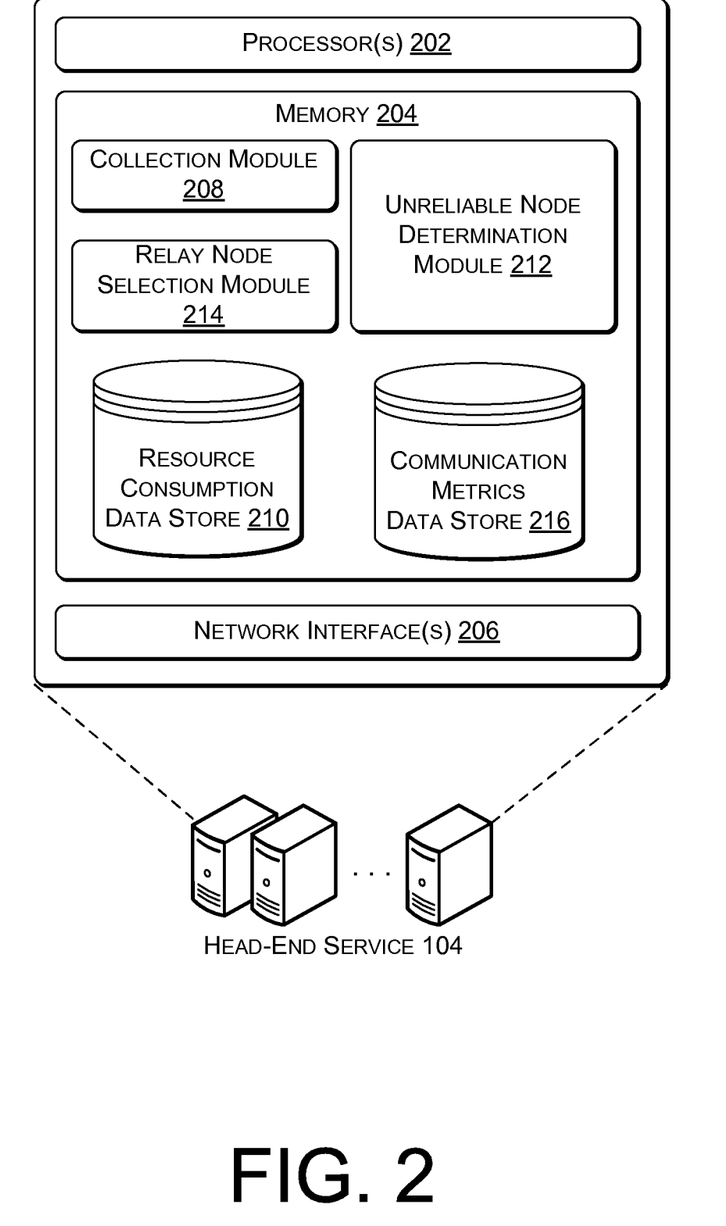
FIG. 2 is a schematic diagram showing additional details of an example head-end service of FIG. 1.

FIG. 2 is a schematic diagram showing additional details of the example head-end service 104 in FIG. 1. The head-end service 104 may be implemented by one or more computing devices, such as one or more servers, laptop computers, desktop computers, and so on. The one or more computing devices may be configured in a cluster, data center, cloud computing environment, or a combination thereof. The one or more computing devices may provide cloud computing resources, including computational resources, storage resources, and the like, that may operate remotely to a client device. In some instances, the head-end service 104 is associated with a central office of a utility to perform centralized meter information collection and/or meter data management techniques.

The one or more computing devices of the head-end service 104 may be equipped with one or more processors 202, memory 204, and one or more network interfaces 206. The memory 204 may be communicatively coupled to the one or more processors 202 and may include software functionality configured as one or more modules. As used herein, the term "module" is intended to represent example divisions of software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the functionality of the modules may be implemented in whole or in part by hardware (e.g., as an ASIC, a specialized processing unit, etc.) to execute the described functions.

As illustrated in FIG. 2, the memory 204 may include a collection module 208 configured to collect resource consumption data from the nodes 102. Resource consumption data may include electricity consumption data, water consumption data, gas consumption data (e.g., natural gas), and so on. The resource consumption data may be collected on a periodic basis, in response to a command and/or at random times. The resource consumption data may be stored in a resource consumption data store 210.

The memory 204 may also include an unreliable node determination module 212 configured to determine (e.g., identify) whether or not a node is an unreliable node (e.g., unable to reliably transmit data). The determination may be based on one or more communication metrics of a node with respect to the head-end service 104, the node 102(1), and/or any other device. For example, a node may be found when it is determined that less than a threshold number of communications have been received from the node during a period of time (e.g., zero communications during a last week), that a particular number of communications from the node do not satisfy a threshold level of quality (e.g., bit error rate, signal-to-noise ratio, etc.), that a ratio of a number of communications received from the node to a number of expected communications from the node is less than a threshold, and so on.

The memory 204 may include a relay node selection module 214 configured to select a node to relay data for an unreliable node. The relay node selection module 214 may select a node that is in communication range of an unreliable node, such as within a predetermined distance (e.g., 500 feet). The selection may be based on one or more communication metrics. For example, the relay node selection module 214 may select a node to act as a relay when a particular number of communications are received from the node over a time period, a ratio of received communications to expected communications from the node is greater than a threshold, a quality of communications received from the node is greater than a threshold, the node is not already a relay to an excessive number of other nodes (e.g., a particular number of nodes), and so on. In general, the relay node selection module 214 may seek to select a reliable node to ensure that communications from an unreliable node are received.

The memory 204 may also include a communication metrics data store 216 to store one or more communication metrics of the nodes 102 of the utility node network.

Although the memory 204 is depicted in FIG. 2 as a single unit, the memory 204 (and all other memory described herein) may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Utility Node Device

Figure 3:
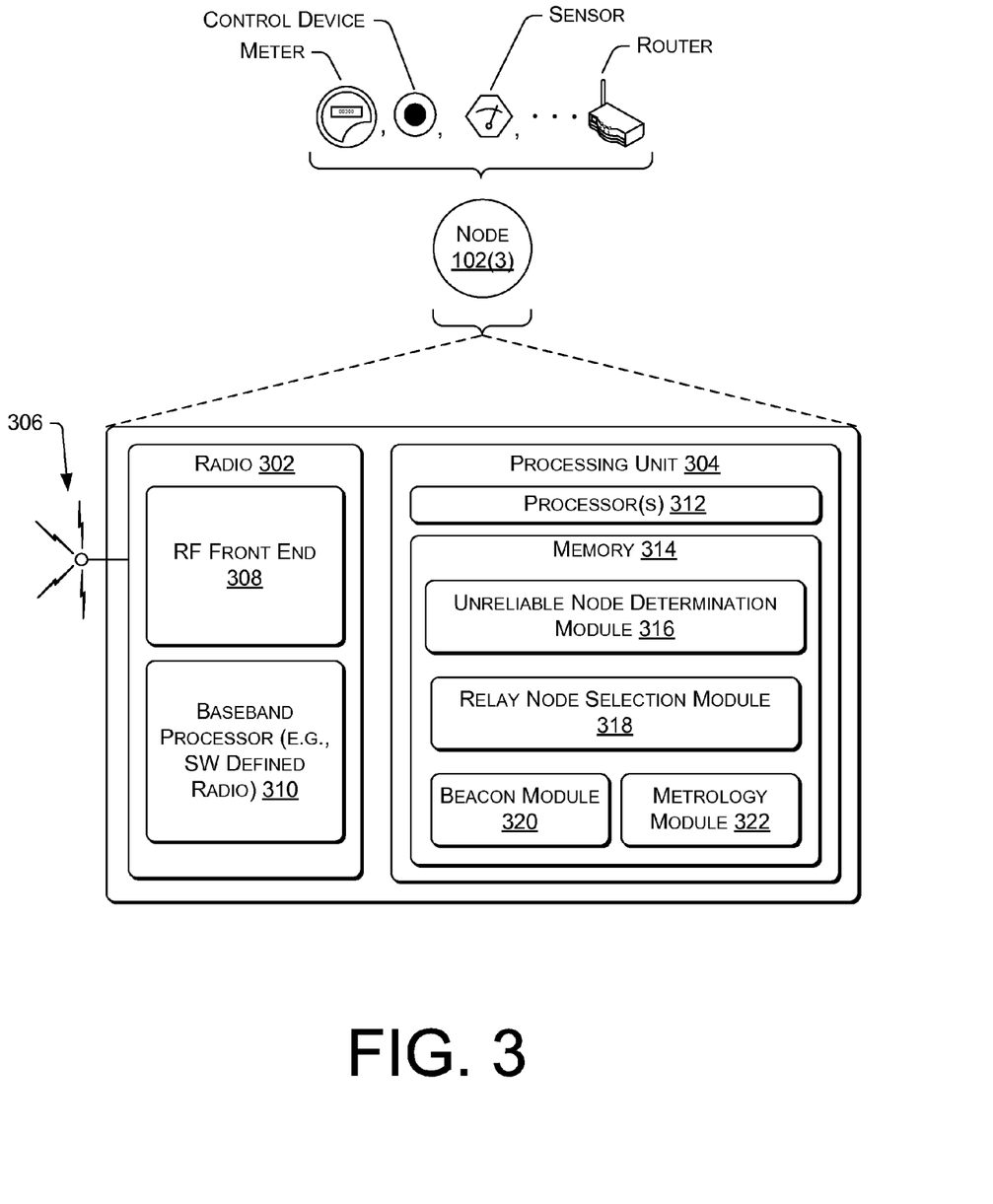
FIG. 3 is a schematic diagram showing additional details of an example node of FIG. 1.

FIG. 3 is a schematic diagram showing additional details of example node 102(3) in FIG. 1. The node 102(3) is representative of each of the nodes 102 in the example 100. The node 102(3) may include a radio 302 and a processing unit 304. The radio 302 may comprise an RF transceiver configured to transmit and/or receive RF signals via one or more of a plurality of channels/frequencies. The radio 302 may also be configured to communicate using a plurality of different modulation schemes, data rates, protocols, signal strengths, and/or power levels. In the example of FIG. 3, the radio 302 includes an antenna 306 coupled to an RF front end 308 and a baseband processor 310. The RF front end 308 may provide transmitting and/or receiving functions. The RF front end 308 may include high-frequency analog and/or hardware components that provide functionality, such as tuning and/or attenuating signals provided by the antenna and obtained from one or more of the nodes 102. The RF front end 308 may provide a signal to the baseband processor 310.

In one example, all or part of the baseband processor 310 may be configured as a software (SW) defined radio. In one implementation, the baseband processor 310 provides frequency and/or channel selection functionality to the radio 302. For example, the SW defined radio may include mixers, filters, amplifiers, modulators and/or demodulators, detectors, etc., implemented in software executed by a processor, gate array or application specific integrated circuit (ASIC) or other embedded computing device(s). The SW defined radio may utilize one or more processors 312 and software defined and/or stored in memory 314. Alternatively, the radio 302 may be implemented at least in part using analog components.

The processing unit 304 may include the one or more processors 312 communicatively coupled to the memory 314. The memory 314 may be configured to store an unreliable node determination module 316, a relay node selection module 318, a beacon module 320, and/or a metrology module 322.

The unreliable node determination module 316 may be configured to determine whether or not a node is an unreliable node (e.g., unable to reliably transmit data). In some instances, the determination includes receiving a message indicating that a node is an unreliable node. To illustrate, the node 102(3) may receive a message from the node 102(1) or the node 102(N) indicating that communications from the node 102(N) are unable to be reliably heard. In some instances, the unreliable node determination module 316 may determine that the node itself is unreliable. To illustrate, if the node 102(3) has not received one or more scheduled communications during a time period from the node 102(1), the node 102(3) may determine that it is an unreliable node. Further, in some instances the unreliable node determination module 316 operates similar to, or the same as, the unreliable node determination module 212.

The relay node selection module 318 may be configured to select a node to relay data for an unreliable node. The selection may be based on one or more communication metrics of nodes. In some instances, the relay node selection module 318 may select the node itself to communicate with an unreliable node. To illustrate, when the node 102(N) is unreliably heard and the node 102(3) is within close proximity to the node 102(N), the node 102(3) may select itself to relay data for the node 102(N). In some instances, the relay node selection module 318 operates similar to, or the same as, the relay node selection module 214.

The beacon module 320 may be configured to transmit one or more beacon messages when it is determined that the node 102(3) is not able to reliably transmit data. A beacon message may indicate that the node 102(3) is unable to reliably transmit data and/or may request that another node relay data of the node 102(3). Beacon messages may be transmitted periodically until a relay relationship is established. In some instances, the beacon module 320 implemented on one node may communicate with the unreliable node determination module 316 and/or relay node selection module 318 implemented on another node in an attempt to initiate a relay relationship.

The metrology module 318 may be configured to collect/generate resource consumption data of one or more resources (e.g., electricity, water, natural gas, etc.). The resource consumption data may include electricity consumption data, water consumption data, and/or gas consumption data (e.g., natural gas) that is associated with a meter device. The resource consumption data may include data generated at any of the nodes 102. The resource consumption data may be transmitted to a data collector in the case of a star network or, in the case of a mesh network, to one or more other nodes 102 for eventual propagation to the head-end service 104 or another destination.

Example Processes

Figure 4:
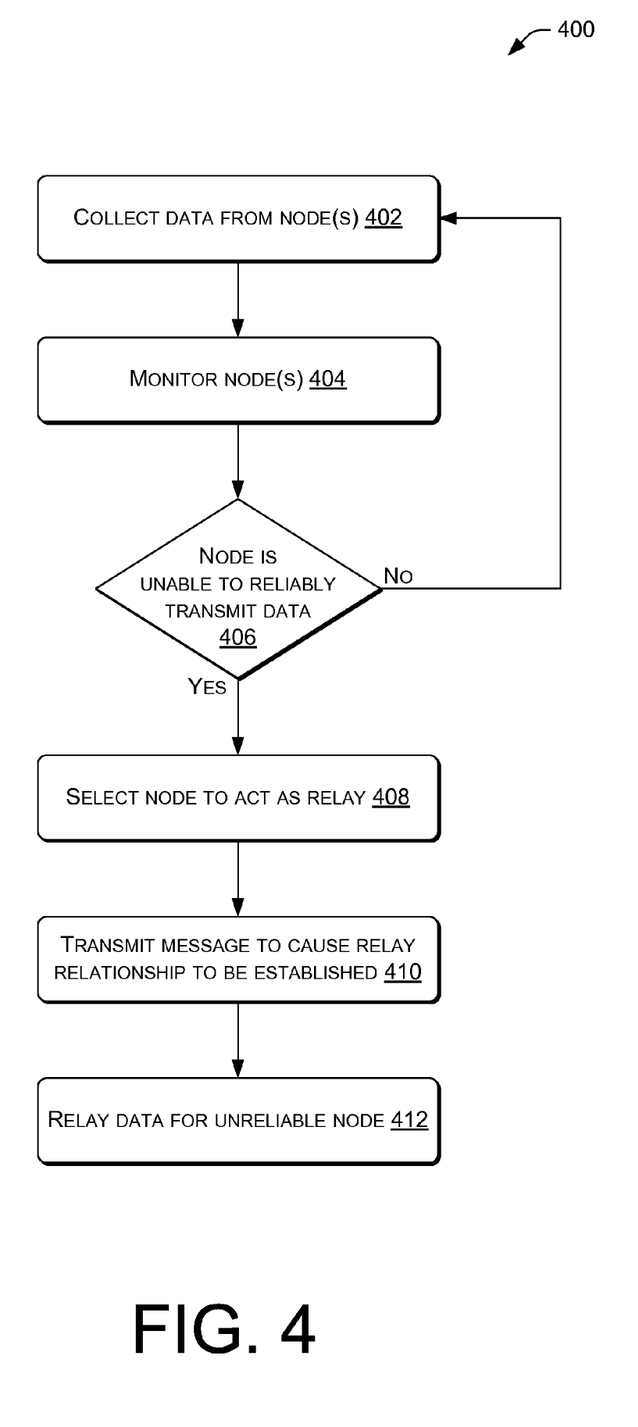
FIG. 4 illustrates an example process to monitor nodes of a utility node network to determine when a node is unable to reliably transmit data and to cause data of an unreliable node to be relayed.
Figure 5:
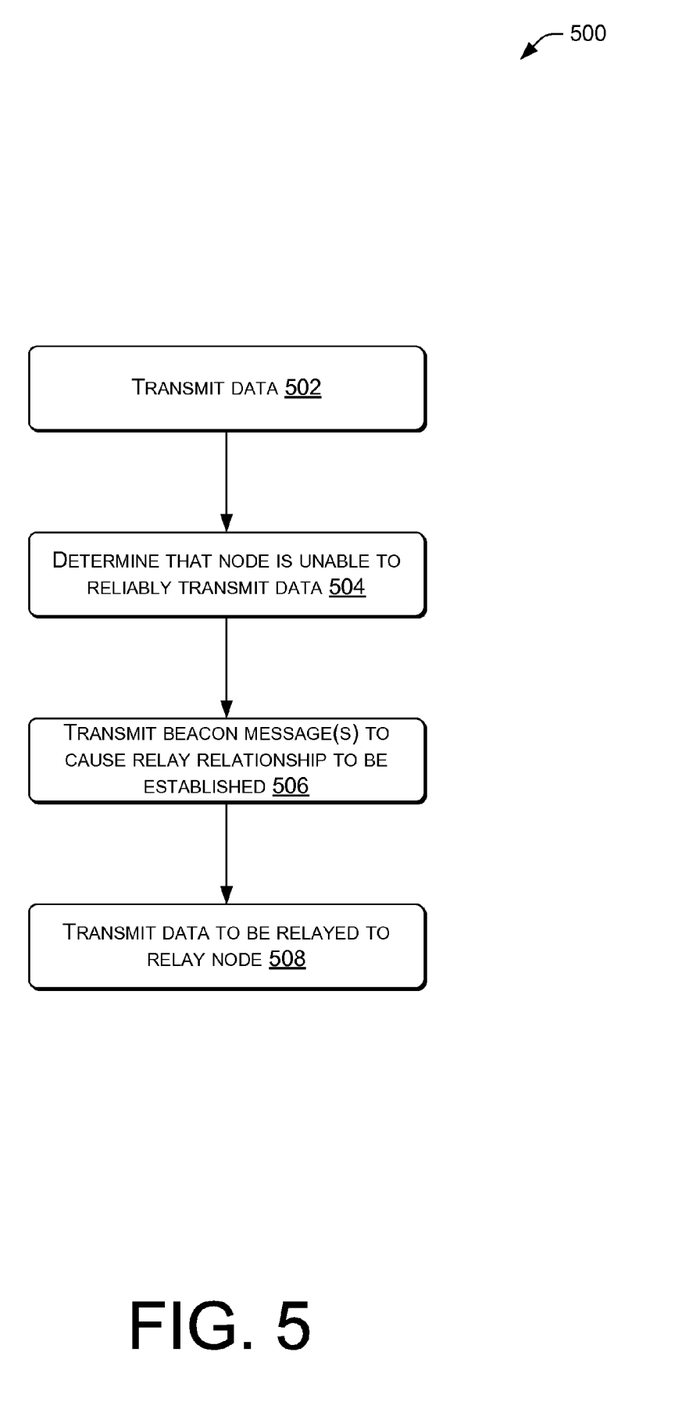
FIG. 5 illustrates an example process to determine that a node is unable to reliably transmit data and to establish a relay relationship to relay data of the node.

FIGS. 4-5 illustrate example processes 400 and 500 for employing the techniques described herein. For ease of illustration processes 400 and 500 are described as being performed in the architecture 100 of FIG. 1. For example, one or more of the individual operations of the processes 400 and 500 may be performed by the head-end service 104 and/or any of the nodes 102. For ease of illustration the process 400 is described as being performed by the node 102(1), while the process 500 is described as being performed by the node 102(N). However, the processes 400 and 500 may be performed in other architectures. Moreover, the architecture 100 may be used to perform other processes.

The processes 400 and 500 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 4 illustrates the example process 400 to monitor nodes of a utility node network to determine when a node is unable to reliably transmit data and to cause data of an unreliable node to be relayed. For ease of illustration the process 400 is described as being performed by the node 102(1) of the architecture 100. However, the process 400 may be performed by any device (e.g., any of the nodes 102, the head-end device 104, etc.).

At 402, the node 102(1) may collect data from one or more of the nodes 102(2)-102(N). The data may include resource consumption data generated or collected at the nodes 102(2)-102(N). The data may be collected to be sent to the head-end service 104.

At 404, the node 102(1) may monitor the nodes 102(2)-102(N). For example, the node 102(1) may monitor one or more communication metrics (e.g., statistics) associated with the nodes 102(2)-102(N), such as a number of communications that are received from the nodes 102(2)-102(N) at the node 102(1), the head-end service 104, a mobile device, and so on.

At 406, the node 102(1) may determine whether or not a node (e.g., endpoint) of the nodes 102(2)-102(N) is an unreliable node. That is, whether or not a node is reliably transmitting data. The determination may be based on the monitoring and/or may be performed by the unreliable node determination module 316. For example, the node 102(N) may be determined to be an unreliable node when no communications (e.g., pieces of data) are received at the node 102(1), the head-end service 104, and/or another device over a particular time period. In another example, the node 102(N) may be determined to be an unreliable node when less than a threshold number of communications are received from the node 102(N).

When it is determined that a node of the nodes 102(2)-102(N) is an unreliable node, the process 400 may proceed to an operation 408 (e.g., the YES branch). Alternatively, when it is determined that the nodes 102(2)-102(N) are reliable nodes, the process 400 may return to the operation 402 (e.g., the NO branch). In some instances, the process 400 may return to the operation 404 instead of returning to the operation 402.

At 408, the node 102(1) may select one of the nodes 102(2)-102(N) to act as a relay for the unreliable node. The node 102(1) may select a node that is within communication range of the unreliable node (e.g., within a predetermined distance). The selection may be based on one or more communication metrics of the nodes 102(2)-102(N). That is, the node 102(1) may generally select a node that is reliably heard over the utility node network. In one example, the operation 408 is performed by the relay node selection module 318.

At 410, the node 102(1) may transmit a message to cause a relay relationship to be established between the selected node and the unreliable node. For example, when the node 102(3) is selected to act as the relay, a message may be sent to the node 102(3) requesting/instructing the node 102(3) to initiate communication with the unreliable node. The node 102(3) may then negotiate one or more communication parameters with the unreliable node to establish a relay relationship. In one example, the operation 410 may include transmitting the command message 110 to the node 102(3).

In some instances, when the process 400 is performed by a node that is to act as the relay node (e.g., the node 102(3)), the operation 410 may include transmitting a message to the unreliable node to negotiate one or more communication parameters. To illustrate, the operation 410 may include transmitting the negotiation message 112(1) to the node 102(N).

At 412, the node 102(3) and/or the node 102(1) may relay data for the unreliable node. For example, when the node 102(N) is an unreliable node, the node 102(3) may receive data from the unreliable node 102(N) and transmit the data to the node 102(1) while utilizing a portion of the communication time of the node 102(3). The node 102(1) may receive the data of the unreliable node 102(N) then forward on (e.g., relay) the data to the head-end service 104.

FIG. 5 illustrates the example process 500 to determine that a node is unable to reliably transmit data and to establish a relay relationship to relay data of the node. For ease of illustration the process 500 is described as being performed by the node 102(N) of the architecture 100. However, the process 500 may be performed by any device (e.g., any of the nodes 102, the head-end device 104, etc.).

At 502, the node 102(N) may transmit data for delivery to the head-end service 104. The data may comprise resource consumption data that is transmitted on a periodic basis (e.g., every 10 seconds). The node 102(N) may transmit the data in an attempt to transfer the data to another device of the utility node network. For example, the node 102(N) may attempt to transfer the data to the node 102(1).

At 504, the node 102(N) may determine that the node 102(N) itself is unable to reliably transmit data over the utility node network and is therefore an unreliable node. Such determination may be made when the node 102(N) does not receive a communication from the node 102(1) at a scheduled time or over a particular period of time (e.g., a number of days). That is, the node 102(N) may determine that it is unreliable when it does not receive an expected communication. Alternatively, the node 102(N) may determine that it is unable to reliably transmit data upon receipt of a message from the node 102(1) and/or the node 102(3) indicating that communications from node 102(N) are inadequate (e.g., the node 102(N) may be able to receive, but not able to transmit). In one example, the operation 504 is performed by the unreliable node determination module 316.

At 506, the node 102(N) may transmit one or more beacon messages to cause a relay relationship to be established. A beacon message may indicate that the node 102(N) is unable to reliably transmit data and/or may request that another node relay data of the node 102(N). When another node (e.g., the node 102(3)) receives the beacon message, the other node may enter into a relay relationship with the node 102(N). The one or more beacon messages may be transmitted periodically until a relay relationship is established. In one example, the operation 506 is performed by the beacon module 320.

At 508, the node 102(N) may transmit data to be relayed to a node acting as a relay (e.g., the node 102(3)). The data may comprise resource consumption data. The data may be transmitted according to one or more established communication parameters between the node 102(N) and the relay node. Thereafter, the relay node may relay the data through the utility node network for delivery to the head-end service 104 or another device. While data of the node 102(N) is relayed, the node 102(N) may attempt to transmit the data through the utility node network (e.g., to the node 102(1)). This may allow the data to be heard in the event that a transmission is able to be received through the normal communication channels (e.g., at the node 102(1)).

When the node 102(N) and/or the relay node are battery-powered devices, the node 102(N) and/or the relay node may switch between active and inactive states. For instances, when the node 102(N) and/or the relay node are not communicating, the node 102(N) and/or the relay node may be set to an inactive state (e.g., non-powered or sleep mode). When the node 102(N) and/or the relay node need to communicate, which may be determined based on an established time to relay data, the node 102(N) and/or the relay node may be set to an active (e.g., powered or fully activated mode). This may enable the node 102(N) and/or the relay node to conserve battery life.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
under control of one or more processors configured with specific executable instructions,
determining that a first leaf endpoint of a network is unable to reliably transmit data to a central node of the network, the central node being within wireless communication range of the first leaf endpoint, the network being initially configured as a star network;
selecting a second leaf endpoint to relay data for the first leaf endpoint based at least in part on one or more communication metrics of the second leaf endpoint, the second leaf endpoint being within communication range of the first leaf endpoint and within wireless communication range of the central node; and
causing the second leaf endpoint to relay data of the first leaf endpoint to the central node of the network.

2. The method of claim 1, wherein the one or more processors are included in a head-end device and determining comprises determining that data of the first leaf endpoint has not been received at the head-end device over a period of time.

3. The method of claim 1, wherein the one or more processors are included in a collector, a repeater, a relay, a router, and/or a mobile device and determining comprises determining that data of the first leaf endpoint has not been received at the collector, the repeater, the relay, the router, and/or the mobile device over a period of time.

4. The method of claim 1, wherein the one or more processors are included in the second leaf endpoint and determining comprises receiving a beacon message from the first endpoint indicating that the first leaf endpoint is unable to reliably transmit data.

5. The method of claim 1, wherein the one or more processors are included in the first leaf endpoint and determining comprises determining that a message has not been received from a collector, a repeater, a relay, a router, and/or a mobile device over a period of time.

6. The method of claim 1, wherein causing the second leaf endpoint to relay data of the first leaf endpoint comprises transmitting the data of the first leaf endpoint from the second leaf endpoint within a portion of a period of time that is established for transmitting data of the second leaf endpoint.

7. A system comprising:
one or more processors; and
memory storing the specific executable instructions that, when executed by the one or more processors, cause the one or more processors to perform the method of claim 1.

8. One or more computer-readable storage media storing computer-readable instructions that, when executed, instruct a processing unit to perform operations comprising:
determining that a first leaf endpoint of a network is unable to reliably communicate with a central node of the network, the central node being within wireless communication range of the first leaf endpoint, the network being initially configured as a star network;
selecting a second leaf endpoint of the network to relay data for the first leaf endpoint based at least in part on one or more communication metrics of the second leaf endpoint, the one or more communication metrics indicating a number or quality of communications received from the second leaf endpoint, the second leaf endpoint being within communication range of the first leaf endpoint and within wireless communication range of the central node; and
transmitting one or more messages to the second leaf endpoint to cause the second leaf endpoint to relay data for the first leaf endpoint.

9. The one or more computer-readable storage media of claim 8, wherein the one or more communication metrics include at least one of the number of communications received from the second leaf endpoint, or a ratio of received communications of the second leaf endpoint to expected communications from the second leaf endpoint.

10. The one or more computer-readable storage media of claim 8, wherein the determining comprises determining that the first leaf endpoint is unable to reliably communicate with a collector, a repeater, a relay, a mobile device, a router, and/or a head-end device.

11. The one or more computer-readable storage media of claim 8, wherein the one or more messages comprises one or more beacon messages that are transmitted from the first leaf endpoint to request that data of the first leaf endpoint be relayed.

12. The one or more computer-readable storage media of claim 8, wherein the one or more communication metrics include the quality of communications received from the second leaf endpoint.

13. A system comprising:
one or more processors; and
memory communicatively coupled to the one or more processors and storing executable instructions that, when executed by the one or more processors, cause the one or more processors to perform operations comprising:
determining that a first endpoint of a network is unable to reliably transmit data to a central node of the network, the central node being within wireless communication range of the first endpoint, the network being initially configured as a star network;
selecting a second endpoint to relay data for the first endpoint based at least in part on one or more communication metrics of the second endpoint, the second endpoint being within communication range of the first endpoint and within wireless communication range of the central node; and
causing the second endpoint to relay data of the first endpoint to the central node of the network.

14. The system of claim 13, wherein the system comprises a head-end device and the determining comprises determining that data of the first endpoint has not been received at the head-end device over a period of time.

15. The system of claim 13, wherein the system comprises at least one of the first endpoint, the second endpoint, or the central node.

16. The system of claim 13, wherein the determining comprises determining that the first endpoint is unable to reliably transmit data based at least in part on a message that is received from at least one of a collector, a repeater, a relay, a router, a mobile device, or a head-end device, the message indicating that the first endpoint is unable to reliably transmit data over the network.

17. The system of claim 13, wherein the causing the second endpoint to relay data of the first endpoint to the central node comprises:
    transmitting one or more messages between the first endpoint and the second endpoint to establish one or more communication parameters for relaying the data of the first endpoint, the one or more communication parameters indicating at least one of a time for receiving data of the first endpoint or a communication channel on which to receive the data of the first endpoint, and the operations further comprise:
    relaying the data of the first endpoint through the second endpoint based at least in part on the one or more communication parameters.

18. The system of claim 13, wherein the operations further comprise:
    while the second endpoint acts as a relay node for the first endpoint, transmitting the data of the first endpoint from the first endpoint in an attempt to communicate the data over the network.

19. The system of claim 13, wherein the first endpoint comprises a battery-powered device, and the operations further comprise:
    setting the first endpoint to an inactive state when the first endpoint is not communicating, the inactive state comprising at least one of a non-powered state or a sleep state; and
    setting the first endpoint to an active state when the first endpoint is communicating.

20. The system of claim 13, wherein the second endpoint comprises a battery-powered device, and the operations further comprise:
    setting the second endpoint to an inactive state when the second endpoint is not communicating, the inactive state comprising at least one of a non-powered state or a sleep state; and
    setting the second endpoint to an active state when the second endpoint is communicating.

* * * * *